(12) United States Patent
Cheng et al.

(10) Patent No.: US 12,165,824 B2
(45) Date of Patent: *Dec. 10, 2024

(54) FUSE APPARATUS WITH INTEGRATED SOLENOIDS

(71) Applicant: Suzhou Littelfuse OVS Co., Ltd., Suzhou (CN)

(72) Inventors: Du Cheng, Suzhou (CN); Yanqiu Jia, Suzhou (CN); Dan Jin, Suzhou (CN)

(73) Assignee: Suzhou Littelfuse OVS Co., Ltd., Suzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,171

(22) Filed: Nov. 2, 2023

(65) Prior Publication Data

US 2024/0062981 A1    Feb. 22, 2024

Related U.S. Application Data

(63) Continuation of application No. 17/626,007, filed as application No. PCT/CN2019/095597 on Jul. 11, 2019, now Pat. No. 11,842,875.

(51) Int. Cl.
*H01H 85/00* (2006.01)
*H01H 85/02* (2006.01)
*H01H 85/54* (2006.01)

(52) U.S. Cl.
CPC .... *H01H 85/0021* (2013.01); *H01H 85/0241* (2013.01); *H01H 85/54* (2013.01); *H01H 2085/0275* (2013.01)

(58) Field of Classification Search
CPC .......... H01H 85/0021; H01H 85/0241; H01H 85/54; H01H 2085/0275; H01H 85/2045; H01H 2085/208; B60R 16/0238
See application file for complete search history.

(56) References Cited

U.S. PATENT DOCUMENTS

| | | | | |
|---|---|---|---|---|
| 7,291,025 | B2* | 11/2007 | Yagi ........................ | H04L 12/66 439/949 |
| 11,842,875 | B2* | 12/2023 | Cheng ................ | H01H 85/2045 |
| 2004/0065463 | A1* | 4/2004 | Ishiguro ................ | H05K 3/103 174/59 |
| 2013/0343030 | A1* | 12/2013 | Hattori ................ | B60R 16/0238 361/824 |
| 2016/0189900 | A1* | 6/2016 | Beauregard ........... | H01F 7/1615 335/170 |
| 2017/0098523 | A1* | 4/2017 | Schwartz ............ | B60R 16/0239 |
| 2017/0338072 | A1* | 11/2017 | Hiremath ............. | H01H 71/025 |

FOREIGN PATENT DOCUMENTS

CN    203707065 U    7/2014
CN    205149739 U    4/2016

* cited by examiner

*Primary Examiner* — Stephen S Sul
(74) *Attorney, Agent, or Firm* — KDW Firm PLLC

(57) ABSTRACT

Provided are approaches for integrating solenoids and fuses within a compact housing. In one approach, a fuse apparatus may include a housing including a main body, a cover coupled to a first side of the main body, and a base coupled to a second side of the main body, wherein the cover and the main body define a fuse cavity, and wherein the base and the main body define a main cavity. The fuse apparatus may further include a plurality of fuses disposed within the fuse cavity, and a plurality of solenoids electrically connected to a printed circuit board (PCB), wherein the plurality of fuses is disposed above the PCB, and wherein the PCB is positioned within the main cavity.

20 Claims, 7 Drawing Sheets

FUSE APPARATUS WITH INTEGRATED SOLENOIDS

CROSS-REFERENCE TO CORRESPONDING APPLICATIONS

This application is a continuation of U.S. nonprovisional patent application Ser. No. 17/626,007 filed Jan. 10, 2022, which is a U.S. national stage filing under 35 U.S.C. § 371 of International Application No. PCT/CN2019/095597, filed Jul. 11, 2019, the entirety of which applications are incorporated by reference herein for all purposes.

FIELD OF THE DISCLOSURE

The disclosure relates generally to circuit protection devices, more particularly, to a fuse apparatus with integrated solenoids.

BACKGROUND OF THE DISCLOSURE

An electrical relay is a device that enables a connection to be made between two electrodes in order to transmit a current. Some relays include a coil and a magnetic switch. When current flows through the coil, a magnetic field is created proportional to the current flow. At a predetermined point, the magnetic field is sufficiently strong to pull the switch's movable contact from its rest, or de-energized position, to its actuated, or energized position pressed against the switch's stationary contact. When the electrical power applied to the coil drops, the strength of the magnetic field drops, releasing the movable contact and allowing it to return to its original de-energized position. As the contacts of a relay are opened or closed, there is an electrical discharge called arcing, which may cause heating and burning of the contacts and typically results in degradation and eventual destruction of the contacts over time.

A solenoid is a specific type of high-current electromagnetic relay. Solenoid operated switches are widely used to supply power to a load device in response to a relatively low level control current supplied to the solenoid. Solenoids may be used in a variety of applications. For example, solenoids may be used in electric starters for ease and convenience of starting various vehicles, including conventional automobiles, trucks, lawn tractors, larger lawn mowers, and the like.

Current solenoids and fuses are typically separated into separate systems, thus requiring different modules and associated wiring. Additionally, internal fuses and solenoids are not sufficiently protected from harsh operating environments, leading to damage of the solenoids and/or fuses.

SUMMARY

In view of the foregoing, it would be advantageous to provide a sealed fuse apparatus with integrated solenoids. In some embodiments, an apparatus may include a housing including a main body, a cover coupled to a first side of the main body, and a base coupled to a second side of the main body, wherein the cover and the main body define a fuse cavity, and wherein the base and the main body define a main cavity. The apparatus may further include a plurality of circuit protection devices disposed within the fuse cavity, and a plurality of solenoids electrically connected to a printed circuit board (PCB), wherein the plurality of circuit protection devices is disposed above the PCB, and wherein the PCB is positioned within the main cavity.

In some embodiments, an assembly may include a housing including a main body, a cover coupled to a first side of the main body, and a base coupled to a second side of the main body, wherein the cover and the main body define a fuse cavity, and wherein the base and the main body define a main cavity. The assembly may further include a plurality of fuses disposed within the fuse cavity, wherein a first fuse of the plurality of fuses is directly coupled to an underside of the cover, and a solenoid electrically connected to a printed circuit board (PCB), wherein the solenoid is configured to electrically engage and disengage a conductive plate coupled to a second fuse of the plurality of fuses upon respective application of power to the solenoid.

In some embodiments a fuse apparatus with integrated solenoids may include a housing including a main body, a cover coupled to a first side of the main body, and a base coupled to a second side of the main body, wherein the cover and the main body define a fuse cavity, and wherein the base and the main body define a main cavity. The fuse apparatus may further include a plurality of fuses disposed within the fuse cavity, and a solenoid disposed within the main cavity. The solenoid may be electrically connected to a printed circuit board (PCB), wherein the solenoid is operable to electrically engage and disengage a conductive plate coupled to a fuse of the plurality of fuses upon respective application of power to the solenoid.

Furthermore, certain elements in some of the figures may be omitted, or illustrated not-to-scale, for illustrative clarity. Cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

Fuse apparatuses and assemblies in accordance with the present disclosure will now be described more fully hereinafter with reference to the accompanying drawings, in which embodiments of the system and method are shown. The fuse apparatuses and assemblies, however, may be embodied in many different forms and should not be construed as being limited to the embodiments set forth herein. Rather, these embodiments are provided so that this disclosure will be thorough and complete, and will fully convey the scope of the system and method to those skilled in the art.

Approaches herein provide a solution to combine solenoids and fuses into an integrated, compact housing assembly. In some embodiments, a printed circuit board assembly (PCBA) may be provided within the housing to allow sharing of power and multiple outputs, which may be controlled by a PCBA controller. A sealed cover of the housing protects the internally positioned fuses and solenoids from harsh environmental conditions.

As will be further evident by the discussion that follows, at least the following advantages are achieved by the embodiments of the present disclosure. Firstly, the present disclosure integrates multiple solenoids and fuses into one smart structure, thus eliminating the need for different modules and associated wirings. Instead, the wiring layout is simplified, and thus the assembly time reduced. Secondly, the fuses and solenoids are housed in a sealed box that protects the components from dust, water, and other contaminants. Thirdly, protection is also ensured by a vent that is waterproof yet air permeable, thus permitting circulation within the housing. Fourthly, when bi-stable solenoids are employed, pulse control to drive coils in a short time may eliminate thermal issues.

Figure 1:
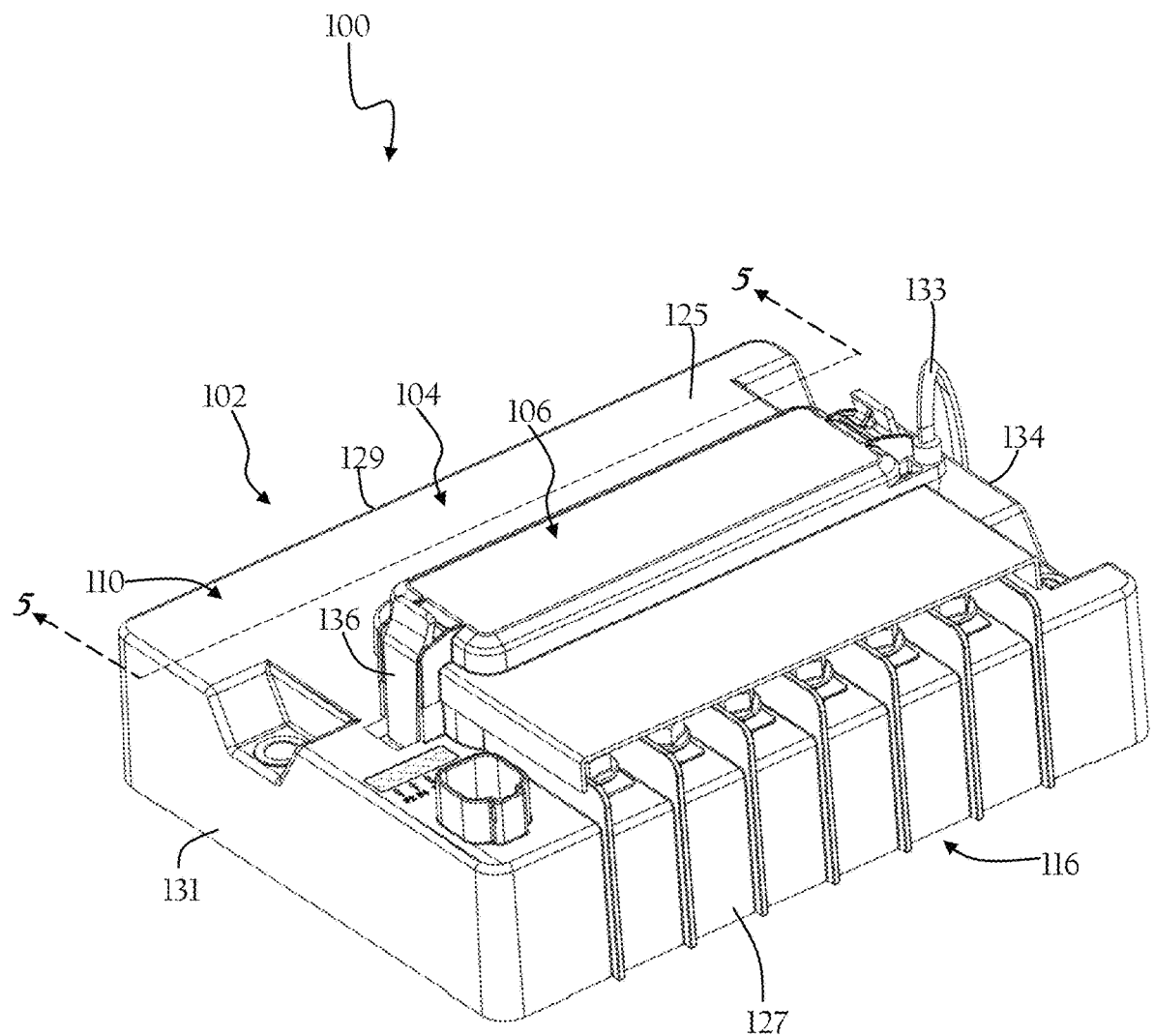
FIG. 1 is an isometric view illustrating an apparatus according to exemplary embodiments.
Figure 2:
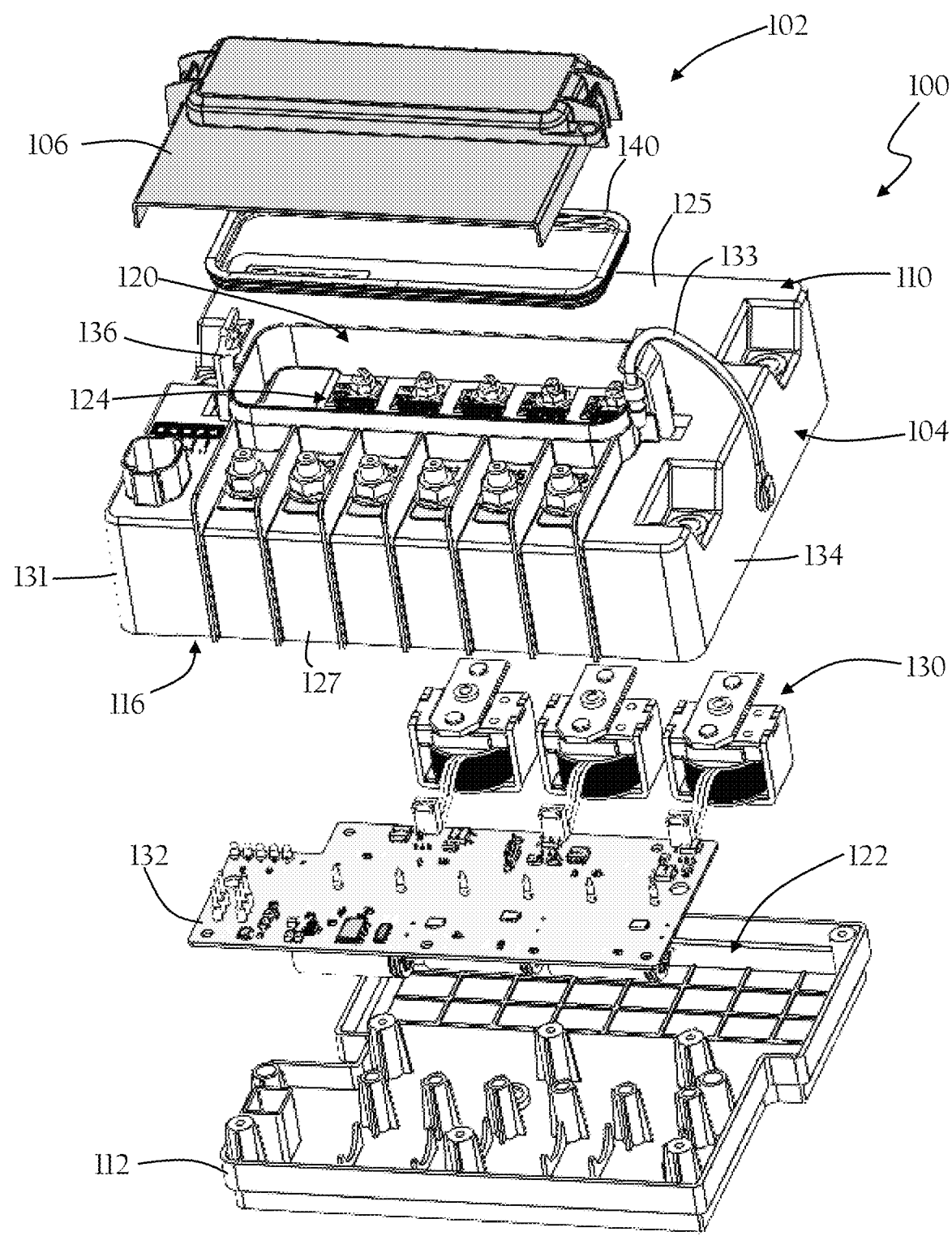
FIG. 2 is an exploded isometric view of the apparatus shown in FIG. 1 according to exemplary embodiments.

Referring to FIGS. 1-2, an exemplary embodiment of a fuse apparatus/assembly (hereinafter, "assembly") 100 in accordance with the present disclosure is shown. The exemplary assembly 100 may include a housing 102 including a main body 104, a cover 106 coupled to a first side 110 of the main body 104, and a base 112 coupled to a second side 116 of the main body 104. Although non-limiting, the various components of the housing 102 may be made of an insulating material, such as an insulating plastic, e.g., nylon, glass-filled nylon, polyester and polycarbonate. In various embodiments, the main body 104, the cover 106, and the base 112 can be made of the same or different materials.

As will be described in greater detail below, the cover 106 and the main body 104 may define a fuse cavity 120. The fuse cavity 120 may include a plurality of circuit protection devices, e.g., fuses 124, disposed therein. Furthermore, the base 112 and the main body 104 define a main cavity 122 housing a plurality of solenoids 130 and a printed circuit board (PCB) 132 therein. More specifically, the main cavity 122 may be surrounded by a first wall 125, a pair of side walls 127 and 129, a pair of end walls 131 and 134, and the base 112. In some embodiments, the solenoids 130 may be electrically connected to the PCB 132.

The cover 106 can be removed, for example, to replace an opened fuse 124 within the fuse cavity 120. In some embodiments, the cover 106 can snap-fit to the main body 104 and/or include one or more latching fasteners 136 to releasably secure the cover 106 to the main body 104. Although not specifically illustrated, the cover 106 may also include means to further facilitate grasping and removal, such as tabs, projections, recesses, etc. In some embodiments, the cover 106 may be tethered to the main body 104 by a flexible connector 133. As further shown, the cover 106 may include a sealing member 140 that prevents dust, moisture, and other contaminants from entering the fuse cavity 120 and the main cavity 122.

Figure 3:
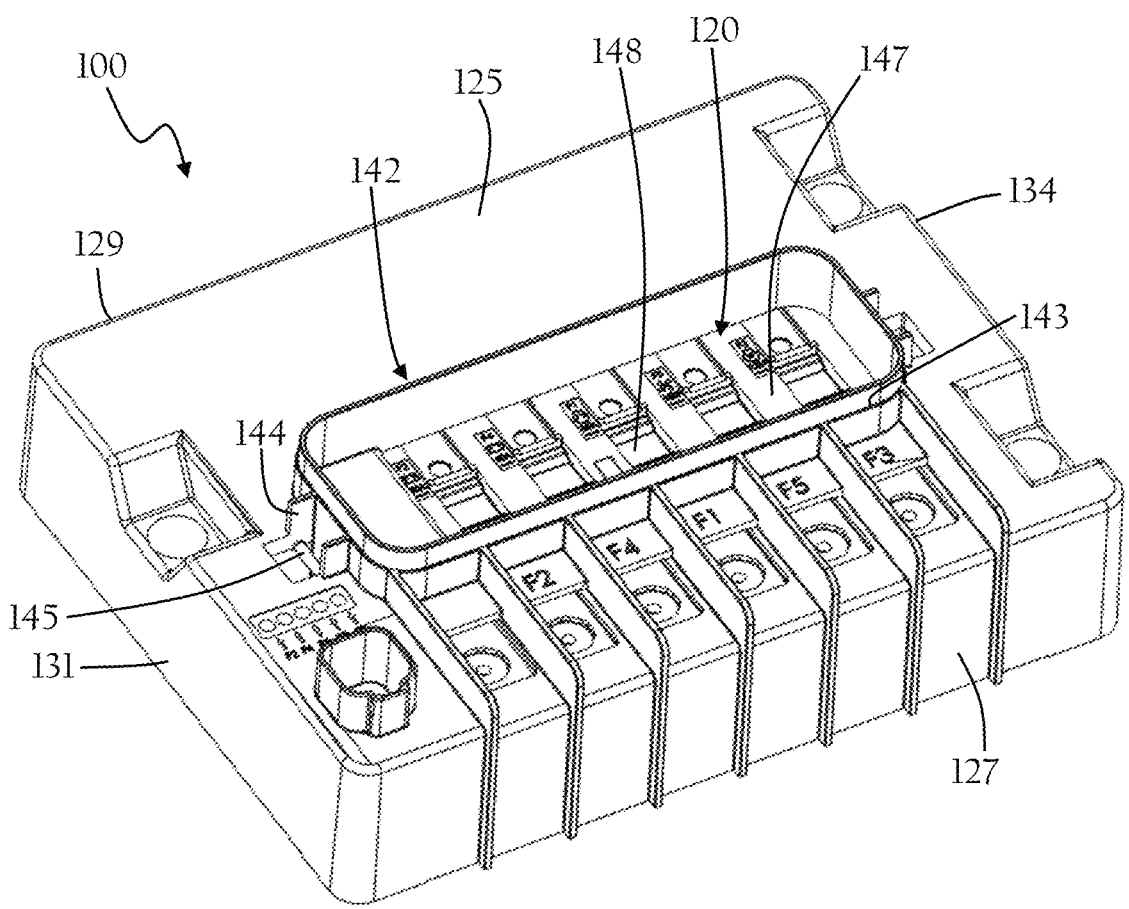
FIG. 3 is a cutaway view of the assembly shown in FIG. 1 according to exemplary embodiments.

Turning now to FIG. 3, the main body 104 of the housing 102 according to embodiments of the present disclosure will be described in greater detail. As shown, the main body 104 may include the first wall 125 connected to the pair of side walls 127, 129 and to the pair of end walls 131, 134. In some embodiments, the main body 104 may include a fuse perimeter wall 142 extending from the first wall 125, wherein the fuse perimeter wall 142 is configured to extend around and above the fuses 124 (FIG. 2). As shown, the fuse perimeter wall 142 may define at least an upper portion of the fuse cavity 120. A lower wall 147 of the fuse cavity 120 may include one or more recesses 148 configured to receive one or more fuses 124 therein.

Although non-limiting, the fuse perimeter wall 142 may generally extend normal to a plane defined by an outer surface of the first wall 125. As shown, the fuse perimeter wall 142 may include an outer ledge 143 and one or more support walls 144 operable to engage and support the cover 106 (FIGS. 1-2) when the main body 104 and the cover 106 are joined together. As further shown, a pin 145 may extend between the support walls 144, wherein the pin 145 permits rotation of the latching fasteners 136 (FIGS. 1-2) thereabout.

Figure 4:
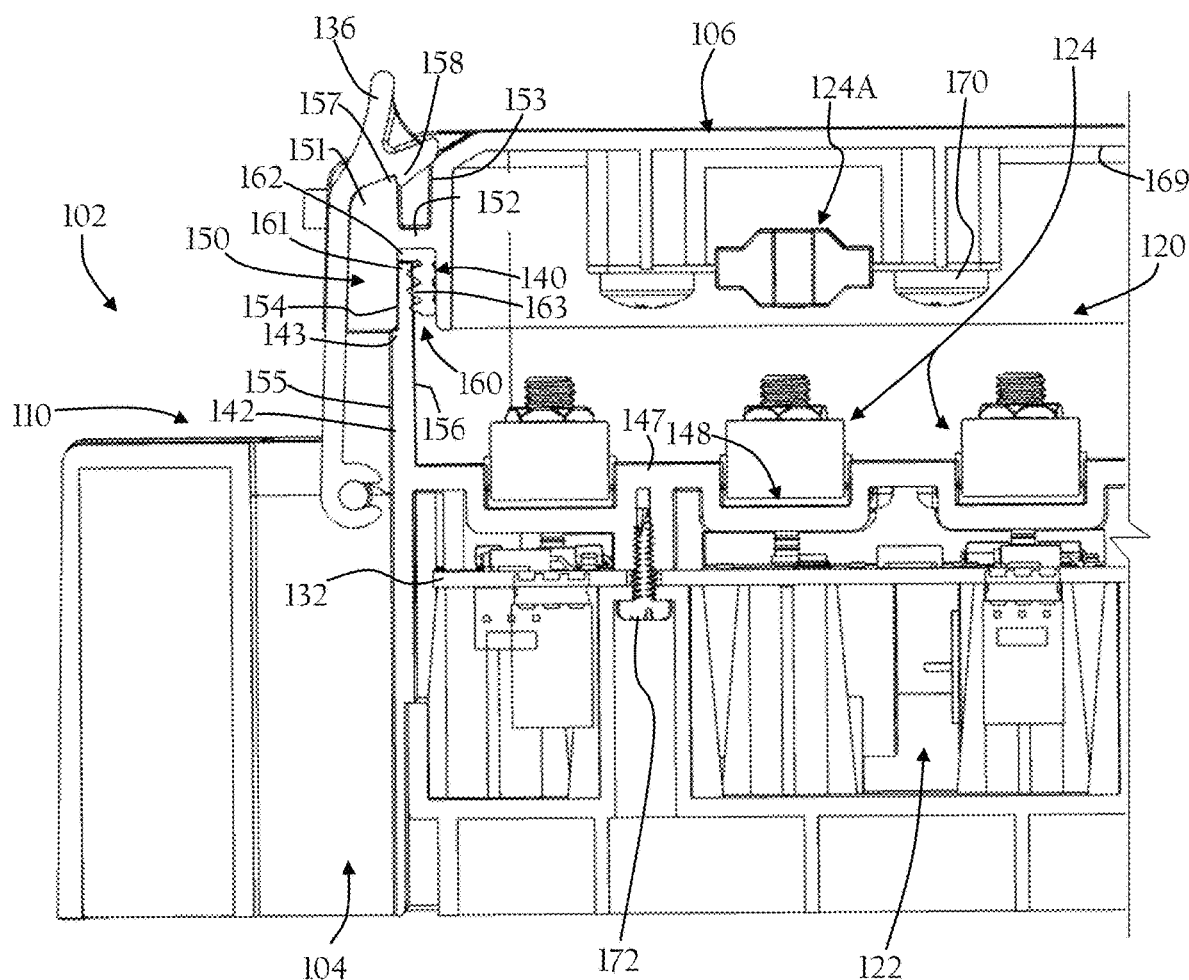
FIG. 4 is a close-up side cross-sectional view of a cover and the main body of the housing of the apparatus of FIG. 1 according to exemplary embodiments.

Turning now to FIG. 4, a close-up view of a physical connection between the cover 106 and the main body 104 according to embodiments of the present disclosure will be described in greater detail. As shown, the cover 106 may be directly coupled to the fuse perimeter wall 142 along the first side 110 of the main body 104. In some embodiments, the cover 106 may include an attachment component 150 engaged with the fuse perimeter wall 142 and with the fastener 136. Specifically, the attachment component 150 may include a head 151 extending from a neck 152, wherein the neck 152 extends from an outer surface 153 of the cover 106. As further shown, an inner surface 154 of the head 151 may engage an outer surface 155 of the fuse perimeter wall 142. In some embodiments, a bottom corner of the head 151 may engage with the outer ledge 143 along the outer surface 155 of the fuse perimeter wall 142. At an opposite end of the inner surface 154, an upper corner 157 and/or engagement surface of the head 151 may engage with a corresponding latching surface 158 of the fastener 136 to maintain a secure connection between the fastener 136 and the cover 106 when the fastener 136 is in a closed position.

As further shown, the sealing member 140 may extend around the outer surface 153 of the cover 106, and along/adjacent an inner surface 156 of the fuse perimeter wall 142. More specifically, the sealing member 140 may be disposed within a slot 160 of the cover 106. As shown, a portion of the fuse perimeter wall 142 may also extend into the slot 160. In some embodiments, the slot 160 may extend around an entire perimeter of the cover 106 to provide protection to the components enclosed by the cover 106 and the main body 104. The sealing member 140 may include a cap 162 configured to extend over, and engage with, an upper surface 161 of the fuse perimeter wall 142. Connected with the cap 162 may be a series of ridges 163 engaged with the inner surface 156 of the fuse perimeter wall 142. During use, the sealing member 140 acts as a mechanical gasket seated in the slot 160, wherein compression resulting from engagement between the cover 106 and the main body 104 creates a seal at the interface thereof. Specifically, the cap 162 may be pressed against the upper surface 161 by the head 151 and the neck 152 of the attachment component 150, while the ridges 163 may be sandwiched between the inner surface 156 of the fuse perimeter wall 142 and the outer surface 153 of the cover 106. Although non-limiting, the sealing member 140 may be an elastomer or a polymer, such as polyethylene, PVC, nylon, etc.

As further shown in FIG. 4, the plurality of fuses 124 may be disposed within the fuse cavity 120. In some embodiments, one or more fuses 124 are retained within respective recesses 148 in the lower wall 147, while fuse 124A may be directly coupled to an inner side 169 of the cover 106. Although non-limiting, the fuse 124A may be secured to the cover 106 by a pair of bolts or screws 170. In some embodiments, the PCB 132 may be coupled to the lower wall 147 by a plurality of fasteners 172 (e.g., screws) secured within corresponding openings, wherein the PCB 132 is retained within the main cavity 122. Although non-limiting, the lower wall 147 may generally separate the fuse cavity 120 from the main cavity 122 of the housing 102.

Figure 5:
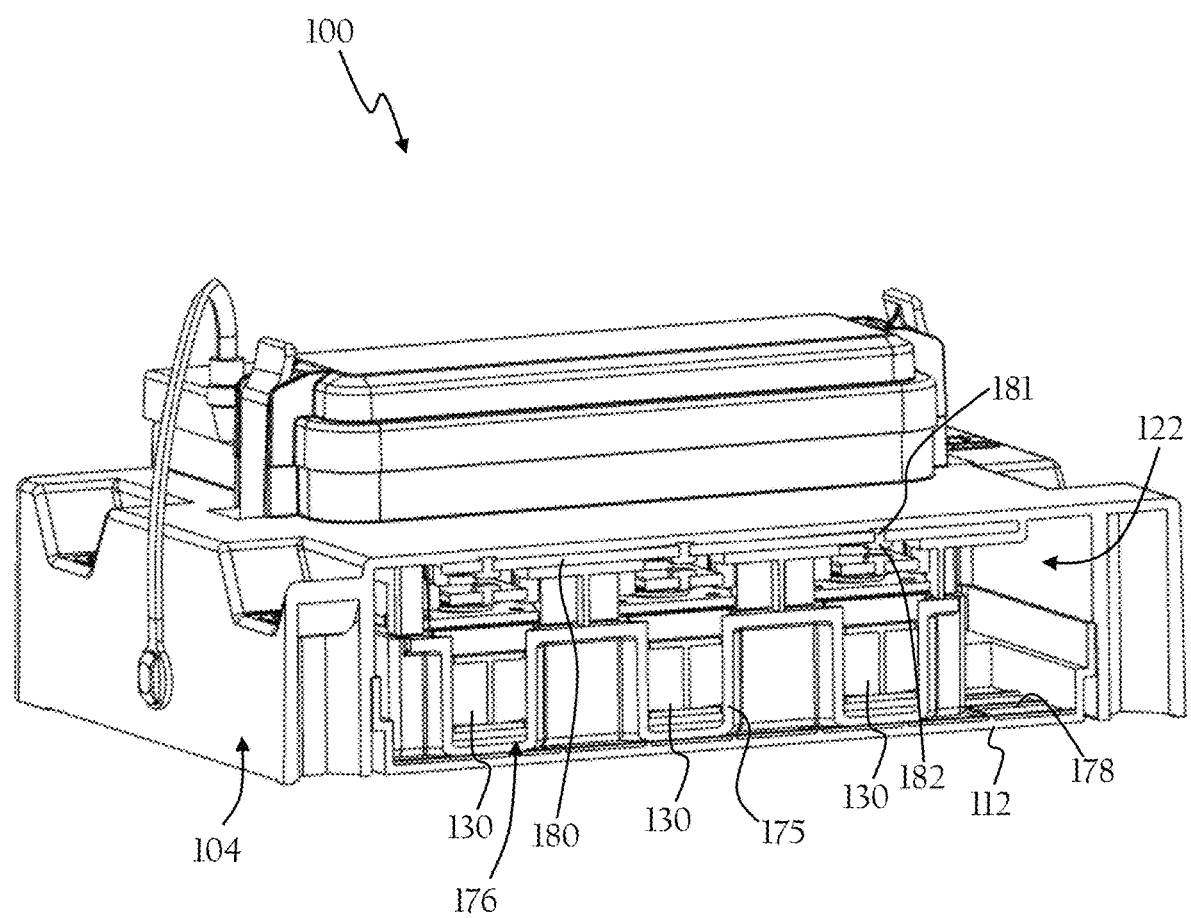
FIG. 5 is an isometric cross-sectional view along cutline 5-5 of FIG. 1 according to exemplary embodiments.

Turning now to FIG. 5, a cross-sectional view of the assembly 100 taken along cutline 5-5 of FIG. 1 will be described in greater detail. As shown, the assembly 100 may include a solenoid housing 175 disposed within the main cavity 122, wherein the solenoid housing 175 includes a plurality of cavities 176 each containing a respective solenoid 130 therein. In some embodiments, the solenoid housing 175 may be disposed directly atop and/or adjacent an inner surface 178 of the base 112.

During use, each solenoid 130 may be operable to electrically engage and disengage one or more conductive plates 180 coupled to respective fuses 124 (not shown) upon respective application of power to the solenoid 130. As shown, the conductive plate(s) 180 may have one or more contacts 181 operable to engage a corresponding contact 182 of the solenoid 130.

Although non-limiting, one or more of the solenoids 130 may be a bi-stable electrical solenoid switch having a plunger responsive to a magnetic field. Although not shown, the solenoids 130 may be connected to a circuit. For example, a controller, such as printed circuit board assembly (PCBA) controller, may operate with the solenoids 130 to provide electrical connection between the solenoids 130, one or more power sources, and other circuitry. In exemplary embodiments, the PCB 132 may the electromechanical connection between these various components.

Figure 6:
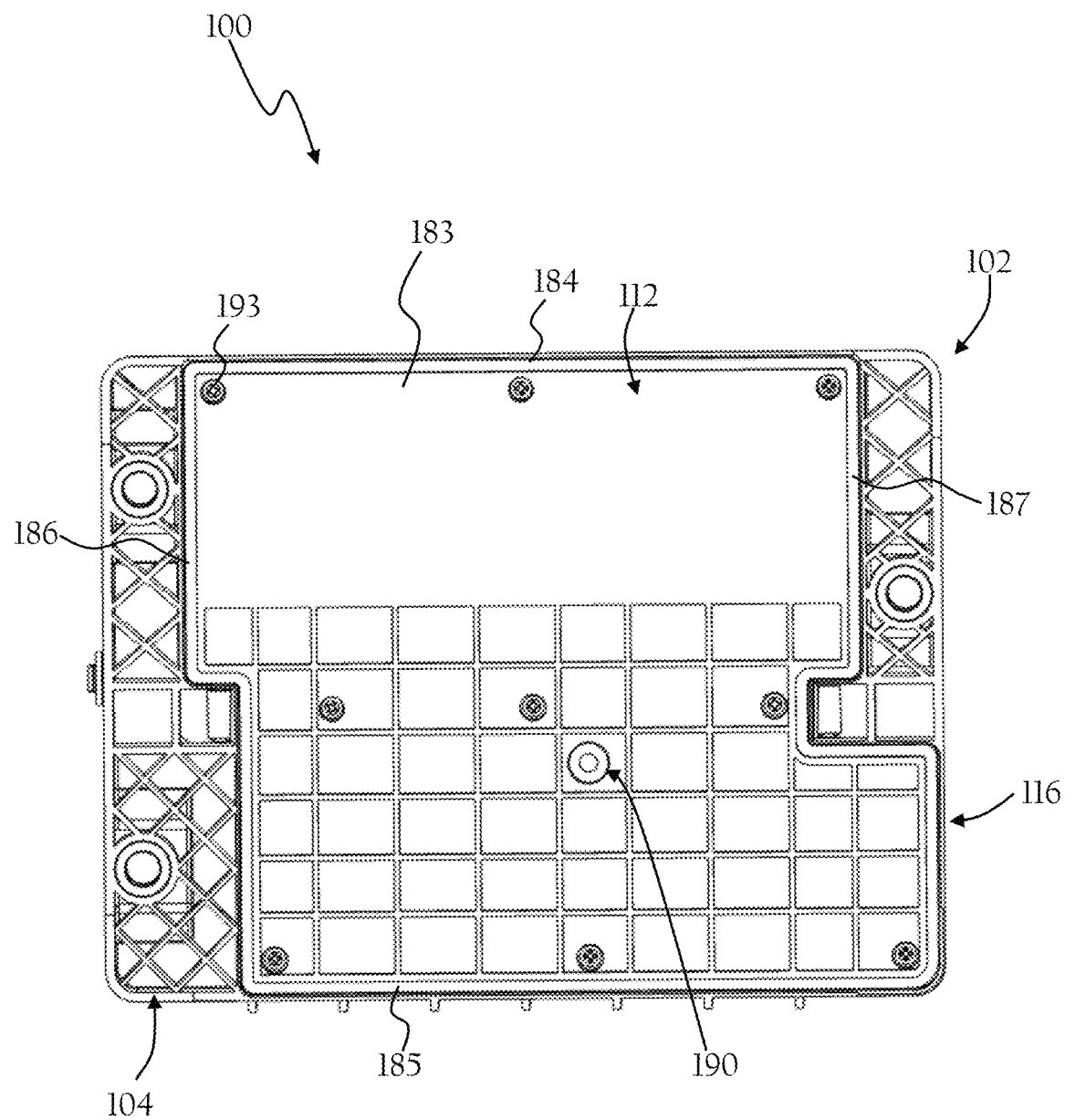
FIG. 6 is a bottom view of the apparatus of FIG. 1 according to exemplary embodiments.
Figure 7:
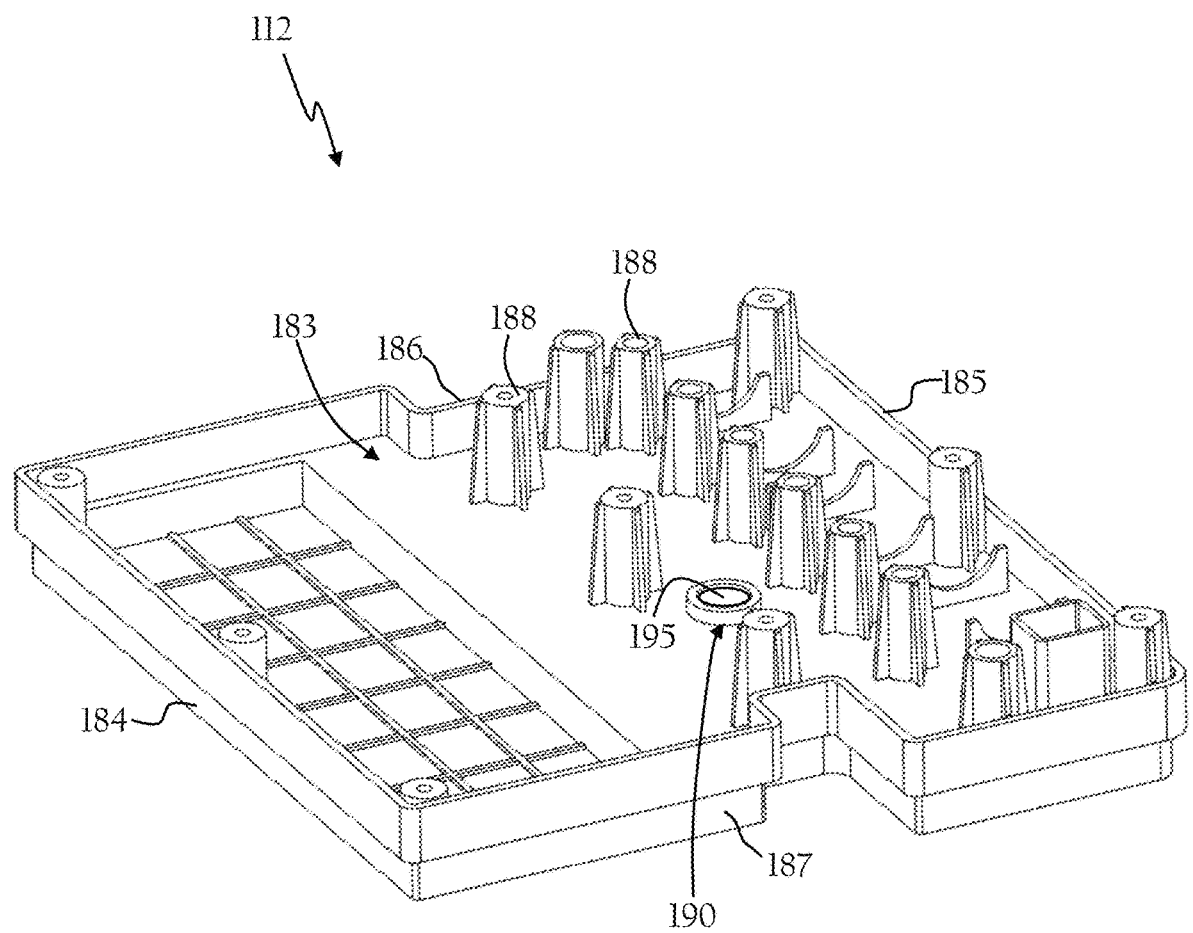
FIG. 7 is an isometric view of a base of the housing of the assembly shown in FIG. 1 according to exemplary embodiments The drawings are not necessarily to scale. The drawings are merely representations, not intended to portray specific parameters of the disclosure. The drawings are intended to depict typical embodiments of the disclosure, and therefore should not be considered as limiting in scope. In the drawings, like numbering represents like elements.

Turning now to FIGS. 6-7, the base 112 of the housing 102 according to embodiments of the present disclosure will be described in greater detail. As shown, the base 112 may include a main wall 183 joined together with a pair of sidewalls 184, 185 and a pair of end walls 186, 187. When joined together, the base 112 and the main body 104 are generally planar or flush with one another along the second side 116, as demonstrated in FIG. 6. The base 112 and the main body 104 may be joined together using virtually any means, such as a plurality of fasteners 193. Embodiments herein are not limited in this context, however.

As shown in FIG. 7, the base 112 may include a plurality of support pillars 188 extending into the main cavity 122. The support pillars 188 may be operable to support one or more components of the assembly 100, e.g., the PCB 132 (not shown). In exemplary embodiments, the support pillars 188 may be integrally formed with the main wall 183. Embodiments herein are not limited to any number or configuration of support pillars 188 however.

As further shown in FIGS. 6-7, a vent 190 may be formed through the main wall 183 of the base 112. In other embodiments, the vent 190 may be formed through any of the sidewalls 184, 185 or the end walls 186, 187. Advantageously, the vent 190, which may be provided directly adjacent a mounting surface (not shown), allows a fluid such as air to flow in and out of the housing 102, thus ensuring that a large pressure differential does not occur, e.g., due to self-heating of components (e.g., the fuses 124) within the housing 102. Minimizing the pressure differential between the interior of the housing 102 and the exterior of the housing 102 also decreases stress on the seals (e.g., sealing member 140) and fasteners (e.g., latch). In some embodiments, the vent 190 may include multiple channels (not shown) extending along main wall 183 of the base 112 to increase air flow and decrease potential for obstruction from contaminants. Furthermore, providing the vent 190 through main wall 183 of the base 112 may enable the housing 102 to be mounted in a variety of diverse locations, thus increasing versatility and value.

In some embodiments, the vent 190 may include a cover 195 including a membrane, such as an expanded polytetrafluoroethylene membrane. The cover 195 may be both waterproof and air permeable/breathable to allow air to pass therethrough. Although not shown, the vent 190 may include one or more support components extending across a vent opening for supporting the cover 195. Furthermore, although the vent 190 and cover 195 are depicted as cylindrically shaped, other shapes and configurations for both the vent 190 and the cover 195 are possible in various alternative embodiments.

As described above, the PCB 132 may provide the circuit routing between the fuses and terminal connections. In some embodiments, the PCB 132 includes traces that run from the fuse mounting terminals to the connector terminals, stud connectors, etc. The PCB 132 may be made of FR-4 material but can alternatively be ceramic if a more rigid material is needed. The PCB 132 can be single or multilayered and is customized as desired by the customer. The PCB 132 can provide a wider trace that serves as a buss bar or common connection for the fuse mounting terminals and connector terminals.

The PCB 132 can also hold other types of circuit protection, such as overvoltage protection in the form of medal oxide varistors ("MOV's"), diodes, and thyristors. The overvoltage protection devices can be used for example to protect low operating voltage or signal level devices placed in the automobile. The overvoltage protection devices can be mounted on a same side of the PCB 132 as the fuses or be located on the opposite or bottom side of the PCB 132.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. An apparatus, comprising:
a housing defining a fuse cavity and a main cavity;
a plurality of circuit protection devices disposed within the fuse cavity; and
a plurality of solenoids electrically connected to a printed circuit board (PCB), wherein
the plurality of circuit protection devices is positioned on a first side of the PCB, and
wherein the PCB is positioned within the main cavity.

2. The apparatus of claim 1, wherein the housing comprises:
a main body;
a cover coupled to a first side of the main body; and
a base coupled to a second side of the main body, wherein the cover and the main body define the fuse cavity, and wherein the base and the main body define the main cavity.

3. The apparatus of claim 2, the main body comprising:
a first wall; and
a fuse perimeter wall extending from the first wall, wherein the fuse perimeter wall extends around one or more of the plurality of circuit protection devices.

4. The apparatus of claim 3, further comprising a sealing member extending around a surface of the fuse perimeter wall.

5. The apparatus of claim 4, wherein the sealing member is disposed within a slot of the cover.

6. The apparatus of claim 5, wherein the fuse perimeter wall extends into the slot of the cover.

7. The apparatus of claim 2, further comprising a solenoid housing disposed within the main cavity, wherein the solenoid housing includes a plurality of cavities each containing a respective solenoid of the plurality of solenoids, and wherein the solenoid housing is disposed directly adjacent an inner surface of a base of the housing.

8. The apparatus of claim 2, wherein at least one of the plurality of circuit protection devices is directly coupled to an inner side of the cover.

9. The apparatus of claim 1, further comprising a vent provided through the housing.

10. An assembly, comprising:
a housing defining a fuse cavity separated from a main cavity;
a plurality of fuses disposed within the fuse cavity, wherein a first fuse of the plurality of fuses is directly coupled to an underside of a cover of the housing; and
a solenoid electrically connected to a printed circuit board (PCB), wherein the solenoid is configured to electrically engage and disengage a conductive plate coupled to a second fuse of the plurality of fuses upon respective application of power to the solenoid.

11. The assembly of claim 10, the housing further comprising a main body, the main body comprising:
a first wall; and
a fuse perimeter wall extending from the first wall, wherein the fuse perimeter wall extends around one or more of the plurality of fuses; and
a sealing member extending around an inner surface of the fuse perimeter wall, wherein
the sealing member is disposed within a slot of the cover.

12. The assembly of claim 11, wherein the fuse perimeter wall extends into the slot of the cover.

13. The assembly of claim 11, further comprising a fastener rotatably coupled to the main body, the fastener operable to secure the cover and the main body together.

14. The assembly of claim 10, further comprising a solenoid housing disposed within the main cavity, wherein the solenoid housing includes a cavity for receiving the solenoid therein, and wherein the solenoid housing is disposed directly adjacent an inner surface of a base of the housing.

15. The assembly of claim 14, further comprising a vent provided through the base of the housing.

16. A fuse apparatus with integrated solenoids, comprising:
a housing defining a fuse cavity and a main cavity;
a plurality of fuses disposed within the fuse cavity; and
a solenoid disposed within the main cavity, wherein the solenoid is electrically connected to a printed circuit board (PCB), and wherein the solenoid is operable to electrically engage and disengage a conductive plate coupled to a fuse of the plurality of fuses upon respective application of power to the solenoid.

17. The fuse apparatus of claim 16, wherein the housing comprises a main body, and wherein the main body comprises:
   a first wall; and
   a fuse perimeter wall extending from the first wall, wherein the fuse perimeter wall extends around one or more of the plurality of fuses; and
   a sealing member extending around an inner surface of the fuse perimeter wall, wherein
   the sealing member is disposed within a slot of a cover, and wherein the fuse perimeter wall extends into the slot of the cover.

18. The fuse apparatus of claim 17, further comprising a fastener rotatably coupled to the main body, the fastener operable to secure the cover and the main body together.

19. The fuse apparatus of claim 17, further comprising a solenoid housing disposed within the main cavity, wherein the solenoid housing includes a cavity for receiving the solenoid therein, and wherein the solenoid housing is disposed directly adjacent an inner surface of a base of the housing.

20. The fuse apparatus of claim 19, further comprising a vent provided through the base of the housing, the vent comprising a waterproof and air permeable cover.

* * * * *